United States Patent
Schlichting

(10) Patent No.: US 6,193,387 B1
(45) Date of Patent: Feb. 27, 2001

(54) LIGHTED FISHING REEL

(75) Inventor: Arthur Allen Schlichting, Omaha, NE (US)

(73) Assignee: Nitelites Fishn' LLC, Omaha, NE (US)

( * ) Notice: Subject to any disclaimer, the term of this patent is extended or adjusted under 35 U.S.C. 154(b) by 0 days.

(21) Appl. No.: 09/289,804

(22) Filed: Apr. 12, 1999

(51) Int. Cl.[7] .................................................. F21V 33/00
(52) U.S. Cl. ..................... 362/109; 362/190; 362/398; 43/17.5; 242/323
(58) Field of Search ............................ 362/109, 191, 362/253, 398, 190; 43/17.5; 242/323

(56) References Cited

U.S. PATENT DOCUMENTS 2,619,559 * 11/1952 Schenkel ........................... 362/109
2,631,792 * 3/1953 Morrison .......................... 362/109

* cited by examiner

Primary Examiner—Thomas M. Sember
(74) Attorney, Agent, or Firm—Rothwell, Figg, Ernst & Manbeck

(57) ABSTRACT

A lighted fishing reel is provided according to the invention. In one embodiment, the lighted fishing reel includes a fishing reel capable of paying out and taking in a fishing line and having a fishing line spool flanked by side flanges and associated flange covers. A bulb is provided with, a socket capable of holding the bulb and having contacts for communicating an electrical current to the bulb. The socket is operably attached to a portion of a fishing reel structure. The portion of the fishing reel structure is selected from the group consisting of a flange cover of the flange covers or both flange covers of the flange covers. A battery is affixed to the fishing reel and a pair of wires extend between the battery and the bulb. Wherein electricity may be permitted to flow through the bulb, illuminating the fishing reel.

9 Claims, 3 Drawing Sheets

LIGHTED FISHING REEL

BACKGROUND OF THE INVENTION

1. Field of the Invention

The present invention is in the field of fishing reels.

2. Description of the Background Art

Fishing is a very popular sport, enjoyed by millions of persons. Catching fish is found to be not only rewarding and relaxing, but may also provide fresh food.

One requirement for successful fishing is having appropriate fishing gear. Typical fishing gear includes a rod and reel, fishing line, a hook, and a lure or bait. Depending on the fishing conditions and on the type of fish desired to be caught, components of the fishing gear may vary. For example, the type and size of fish may dictate the size and strength of the rod, fishing line, and hook. The size of the fish, the type of fishing line, and the desired depth of the hook may influence the choice of reel to be used. The type of fish to be caught obviously influences the selection of a lure or bait. In addition, the choice of fishing gear may be influenced by water depth, current or flow (if any), sediment levels or water cleanliness, waves, etc.

When fishing, a lure or baited hook is cast into a likely spot, and the fisherman then generally waits for a strike. A strike is a bite by a fish on the hook in response to the lure or bait. When a strike occurs, the fisherman sets the hook and the fish is reeled in. If no strike occurs, the fisherman may reel in the fishing line and may cast into a different spot, may change the lure or bait, or both. The casting out and reeling in actions may therefore be performed frequently during fishing.

One of the many type or variations of fishing is night fishing. This may be done for several reasons. First, fish in general, and some types in particular, may feed more at night. This may be due to changes in temperature and availability of insects on which to feed. Second, fishing after dark may present a better level of comfort to a fisherman, especially if daytime temperatures are high. Third, night fishing may better accommodate a fisherman's schedule, and may offer less competition from other fishermen.

However, night fishing has a drawback in that humans have relatively poor night vision. All aspects of fishing may therefore be hampered by reduced vision at night. The critical casting and reeling in actions may be hampered by an inability to see the reel. This may lead to a tangled or improperly fed fishing line, may contribute to slower reactions by a fisherman, or may lead to difficulty in locating controls on the reel.

There remains a need in the art for improved fishing reels.

SUMMARY OF THE INVENTION

A lighted fishing reel is provided according to a first aspect of the invention. The lighted fishing reel comprises a fishing reel capable of paying out and taking in a fishing line and having a fishing line spool flanked by side flanges and associated flange covers, a bulb, a socket capable of holding the bulb and having contacts for communicating an electrical current to the bulb, the socket being operably attached to a portion of a fishing reel structure, with the portion of the fishing reel structure selected from the group consisting of a flange cover of the flange covers or both flange covers of the flange covers, a battery affixed to the fishing reel, and a pair of wires extending between the battery and the bulb, wherein electricity may be permitted to flow through the bulb, illuminating the fishing reel.

The above and other features and advantages of the present invention will be further understood from the following description of the preferred embodiment thereof, taken in conjunction with the accompanying drawings.

DETAILED DESCRIPTION OF THE PREFERRED EMBODIMENTS

Figure 1:
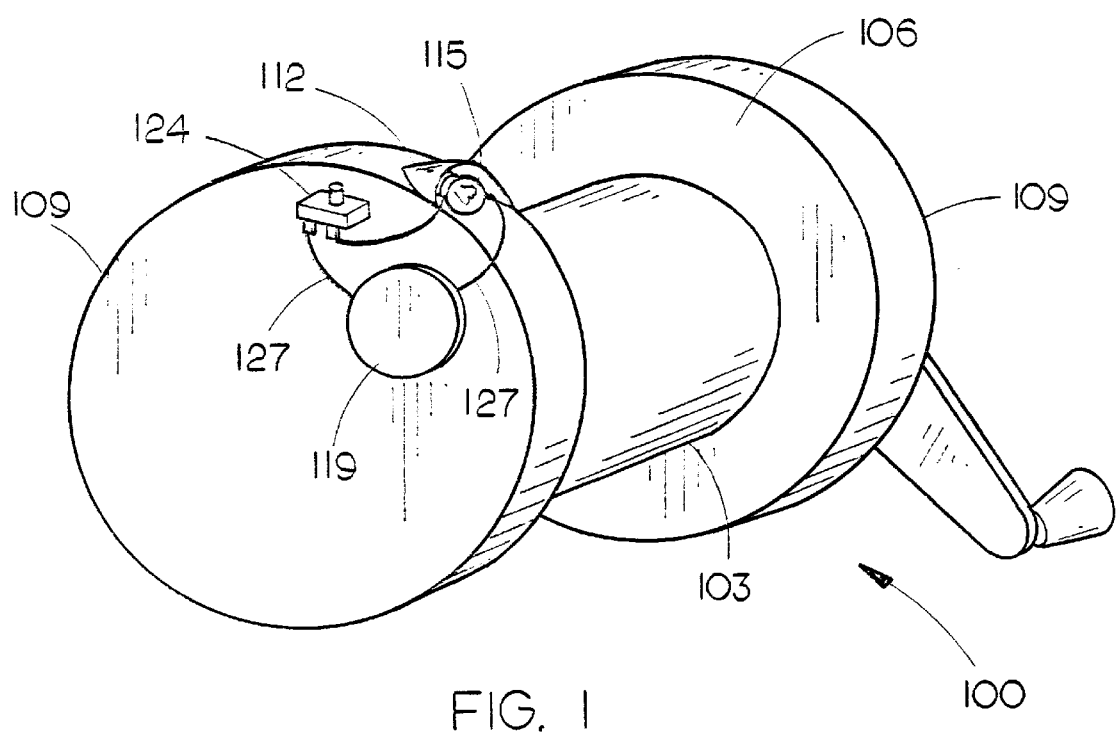
FIG. 1 shows a lighted fishing reel 100 of a first embodiment of the present invention.

FIG. 1 shows a lighted fishing reel 100 of a first embodiment of the present invention. The lighted fishing reel 100 includes a spool 103, a pair of side flanges 106, a pair of flange covers 109, a socket 112, a bulb 115, a battery 119, a switch 124, and a pair of wires 127.

The fishing reel 100 is mounted to a fishing rod (not shown). The spool 103 and the side flanges 106 generally are one unit, and rotate to pay out or take up the fishing line. The side flanges 106 are generally sloping, so that fishing line fed onto the fishing reel 100 is guided onto the spool 103. The flange covers 109 in most fishing reels do not rotate with the spool 103 and side flanges 106, and instead enclose an axle and mounting brackets. The flange covers 109 may curl around and extend partially over the side flanges 106 on some types of fishing reels. Proper feeding of the fishing line onto the spool 103 is critical, in that the fishing line may not unwind properly or may become tangled if the fishing line is not properly taken in. Vigilance on the part of the fisherman is therefore essential in all reeling in actions. The inability to observe both the casting and reeling in actions at night therefore may hamper night fishing.

The socket 112 and the bulb 115 are positioned on the fishing reel 100 so that the bulb 115 may be used to illuminate the fishing reel 100 by, for example, providing illumination to the spool 103. Of course, the socket 112 and bulb 115 may be positioned to provide any desired degree of illumination, and may also be positioned to illuminate any controls of the fishing reel 100. The socket 112 and the bulb 115 may be affixed to the fishing reel 100 through, for example, an adhesive, a magnet, screws or other fasteners, welds, springs, clips, bands, or other means.

The bulb 115 may be a common incandescent bulb having an operating voltage substantially equal to the voltage supplied by the battery 119. In the preferred embodiment, a 1.5 volt light bulb is used. It should be understood, however, that the characteristics of the bulb 115 may be chosen to regulate power consumption and therefore determine battery life. The bulb 115 may be chosen to emit light of a predetermined wavelength, such as red or green light so as to minimize the impact on night vision. Alternatively, a light emitting diode (LED) or a fluorescent bulb may be employed.

The switch 124 is an optional feature. The switch 124 interrupts one wire of the pair of wires 127. If the switch 124 is omitted, the bulb 115 may be energized and de-energized by connecting and disconnecting a wire of the pair of wires 127. The switch 124 may be either a momentary switch (i.e., the switch is spring-loaded and must be held down to keep the bulb 115 energized), or may be an on-off type where the switch 119 can be positioned in either an on state or in an off state. In the preferred embodiment, the switch is an on-off type. Alternatively, the switch 124 may be a rheostat type switch, wherein a user can adjust the switch 124 over a full range of light intensity. The switch 124 is shown as being mounted near the socket 112, but it may be mounted anywhere on the fishing reel 100, or even on an associated fishing rod.

The battery 119 may be any type of general storage battery. In the preferred embodiment, the battery 119 is a 3 volt battery having a disc-like shape. The chemical composition, physical size, and voltage of the battery 119 may be chosen according to considerations of cost, weight, and desired battery life. The battery choice may also be made depending on the desired location of the battery. In the preferred embodiment, the battery 119 is located inside one of the flange covers 109, but may alternatively be located on the outside of the flange covers 109 or may be located inside or on the outside of a handle portion of the fishing rod. The battery 119 may be affixed to the fishing reel 100 through, for example, an adhesive, a magnet, screws or other fasteners, springs, clips, bands, or other means.

Figure 2:
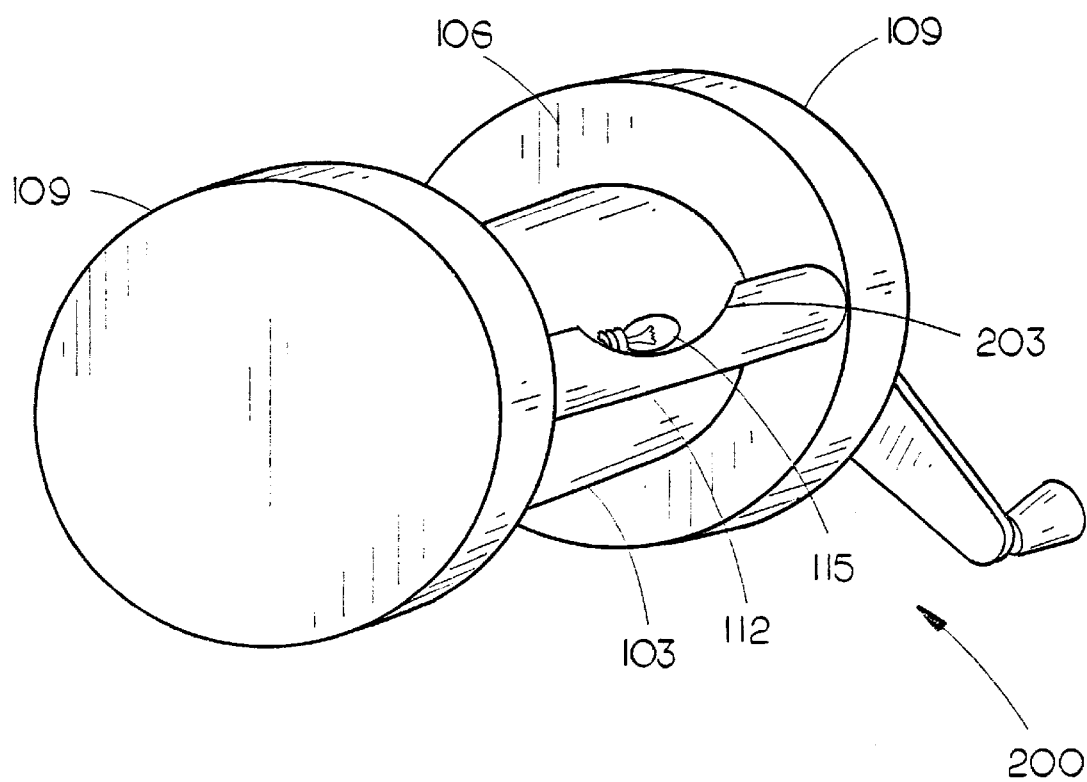
FIG. 2 shows a lighted fishing reel 200 of a second embodiment of the present invention.

FIG. 2 shows a second embodiment 200 of the lighted fishing reel of the present invention. In this embodiment, the socket 112 is in the shape of a tube extending between the side flanges 106. The side flanges 106 in this embodiment therefore cannot rotate with the spool 103, or at least have a portion that does not rotate (i.e., the flange covers 109 curl around and over a portion of the flanges 106). The socket 112 includes a bulb opening 203 through which the bulb 115 may emit light, with the bulb opening 203 and the bulb 115 therefore being positioned directly over the spool 103. In all other respects, the second embodiment 200 is the same as the first embodiment 100, including descriptions of the bulb 115, the battery 124, etc.

Figure 3:
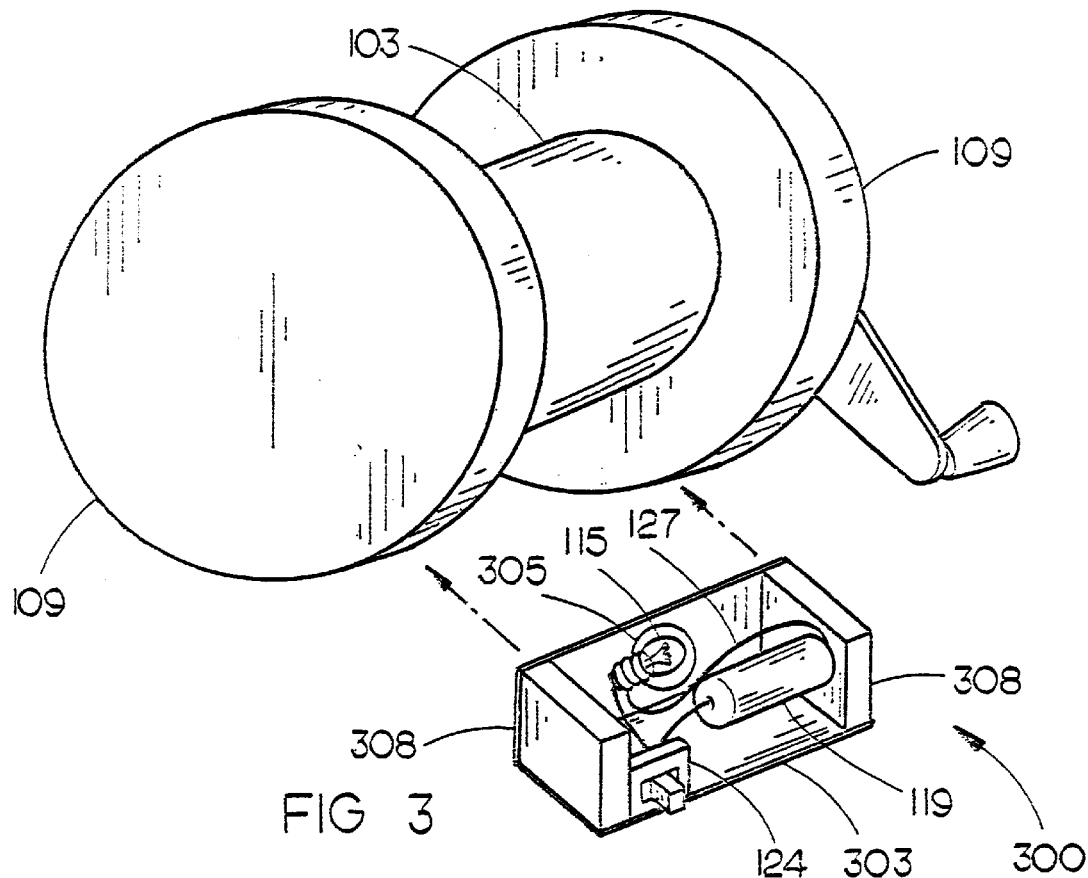
FIG. 3 shows a lighted fishing reel 300 of a third embodiment of the present invention.

FIG. 3 shows a third embodiment 300 of the lighted fishing reel of the present invention. Although the basic components remain the same, the third embodiment 300 differs from the second embodiment 200 in that the bulb 115, the battery 119, and the switch 124 form an integral, removable unit contained within a frame 303. The frame 303 includes a bulb cutout 305 and end magnets 308. The bulb 115 is positioned in the bulb cutout 305, so that when the third embodiment 300 is magnetically attached to the side flanges 109, the bulb 115 illuminates the spool 103. It should be understood that the bulb cutout 305 is not strictly necessary, and instead the face including the bulb cutout 305 could be omitted, and alternatively the bulb face could be the only face of the frame 303 left open. It should be apparent that this configuration could be easily and quickly attached to or removed from a fishing reel, and would not require any modification to the fishing reel. In alternative embodiments, the frame 303 could be attached using other means, such as, for example, a tacky adhesive or clips.

Figure 4:
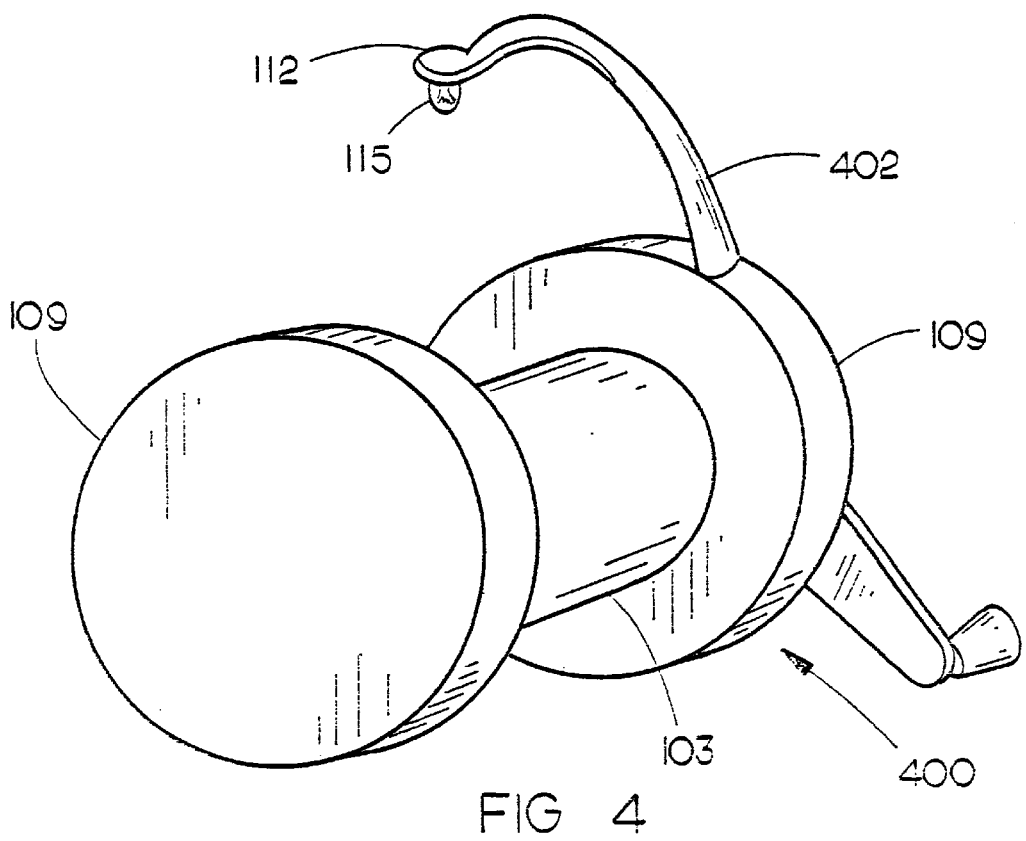
FIG. 4 shows a lighted fishing reel 400 of a fourth embodiment of the present invention.

FIG. 4 shows a fourth embodiment 400 of the lighted fishing reel of the present invention. The fourth embodiment 400 differs from the previous embodiments in that the socket 112 is placed upon a stem 402 that is attached to the flange cover 109. In the preferred embodiment the stem 402 is flexible, allowing the bulb 115 to be placed in any desired position, but alternatively the stem 402 may be rigid. The type and placement of the various other components, including the battery 119 and the switch 124, may be arranged as previously discussed. The stem 402 may be affixed to the fishing reel 400 through, for example, an adhesive, a magnet, screws or other fasteners, welds, springs, clips, a band, or other means.

Figure 5:
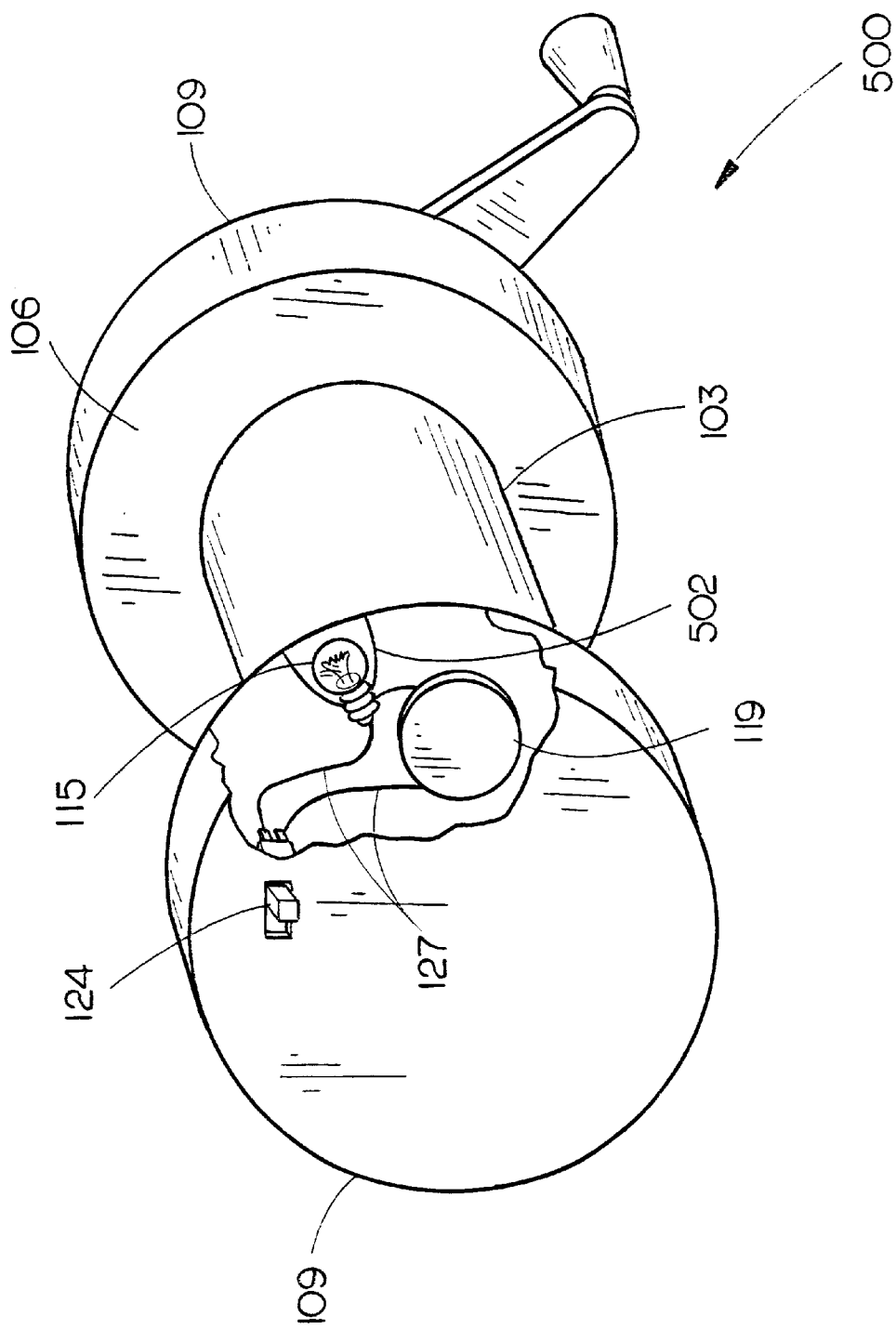
FIG. 5 shows a fifth embodiment 500 of the lighted fishing reel of the present invention.

FIG. 5 shows a fifth embodiment 500 of the lighted fishing reel of the present invention. The fifth embodiment 500 differs from the previous embodiments in that an opening 502 is made on one of the side flanges 106 (the side flange 106 containing the opening 502 of this embodiment may not rotate). By placement of the opening 502 on the fishing reel 500 and by placement of the bulb 115 in the opening 502, the bulb 115 may illuminate the fishing reel 500. An advantage of this embodiment is that the lighting components may be located internally. Also, an existing reel may be easily modified to enjoy the advantages of the present invention. The type and placement of the various other components, including the battery 119 and the switch 124, may be arranged as previously discussed. The bulb 115 may be affixed to the fishing reel 400 through, for example, an adhesive, springs, clips, or a band, or through a socket 112 (not shown) having a magnet, screws or other fasteners, welds, or other means.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A lighted fishing reel, comprising:

a fishing reel capable of paying out and taking in a fishing line and having a fishing line spool flanked by side flanges and associated flange covers;

a bulb;

a socket capable of holding said bulb and having contacts for communicating an electrical current to said bulb, said socket being operably attached to both flange covers of said flange covers, said bulb being positioned in a substantially centered position between said side flanges when in position in said socket;

a battery affixed to said fishing reel; and a pair of wires extending between said battery and said bulb;

wherein electricity may be permitted to flow through said bulb, illuminating said fishing reel.

2. The fishing reel of claim 1, wherein said reel further includes an opening in a side flange of said side flanges and said bulb is positioned in said opening and is therefore capable of illuminating said fishing reel.

3. The fishing reel of claim 1, wherein a switch interrupts a wire of said pair of wires, so that through operation of said switch electricity may be permitted to flow through said bulb.

4. The fishing reel of claim 3, wherein said switch is a momentary switch.

5. The fishing reel of claim 3, wherein said switch is an on-off switch.

6. The fishing reel of claim 3, wherein said bulb, said socket, said battery, said switch, and said pair of wires are contained within an integral frame unit, said integral frame unit having magnets at either end for removably affixing said integral frame unit to said fishing reel.

7. The fishing reel of claim 1, wherein said bulb is an incandescent bulb.

8. The fishing reel of claim 1, wherein said bulb is a light emitting diode.

9. The fishing reel of claim 1, wherein said bulb is a fluorescent bulb.

* * * * *